United States Patent
Pryor

[11] 4,061,195
[45] Dec. 6, 1977

[54] LOCK AND LIFT MECHANISM FOR A FOLDABLE IMPLEMENT

[75] Inventor: Joseph E. Pryor, Athens, Tenn.

[73] Assignee: Austin Industries, Inc., Dallas, Tex.

[21] Appl. No.: 653,965

[22] Filed: Jan. 30, 1976

[51] Int. Cl.² .................. A01B 63/32; A01B 65/02
[52] U.S. Cl. .................................................. 172/456
[58] Field of Search ............... 172/311, 456; 244/49; 182/163; 280/507; 298/23 M, 23 MD, 23 A, 23 S

[56] References Cited

U.S. PATENT DOCUMENTS

| | | | |
|---|---|---|---|
| 1,639,009 | 8/1927 | Singley | 182/163 X |
| 2,011,254 | 8/1935 | Nightingale | 244/49 |
| 2,544,021 | 3/1951 | Holland | 244/49 |
| 2,719,682 | 10/1955 | Handel | 172/456 UX |
| 2,887,259 | 5/1959 | Merpels | 182/163 |
| 3,325,216 | 6/1967 | Boeck | 298/23 MD |
| 3,693,724 | 9/1972 | Fueslein et al. | 172/456 |
| 3,866,689 | 2/1975 | Anderson | 172/311 |

*Primary Examiner*—Paul E. Shapiro
*Attorney, Agent, or Firm*—Richards, Harris & Medlock

[57] ABSTRACT

An improved lock and lift mechanism for a foldable implement wherein the implement is provided with a main section and at least one wing pivotally mounted to the main section. The invention embodies mechanisms which permit the raising (folding) and lowering (unfolding) of the wing relative to the main section and further allow the locking and unlocking of the wing to the main section by a single operation, such as activating a fluid pressure cylinder. The lock and lift mechanism allows the wing to be secured in the lowered position without the necessity of maintaining pressure in the mechanism to keep the wing bar in the lowered position as the implement traverses the ground. The lock and lift mechanism employs registering passageways, one of which is provided on the main section transverse to the axis of the section and the other of which is provided on the wing. A pin is reciprocally mounted within the passageways and a linkage is provided to reciprocate the pin within the passageways so that the pin will lock the wing to the main section when the wing is in an extended position. A powered member is provided to move the pin through the rotatable bar attached to the wing and also elevate and lower the wing relative to the main section. The rotatable bar, after moving the pin through a limited distance, sufficient to retract it from the first passageway, engages a stop which permits the powered member to lift the wing section.

9 Claims, 7 Drawing Figures

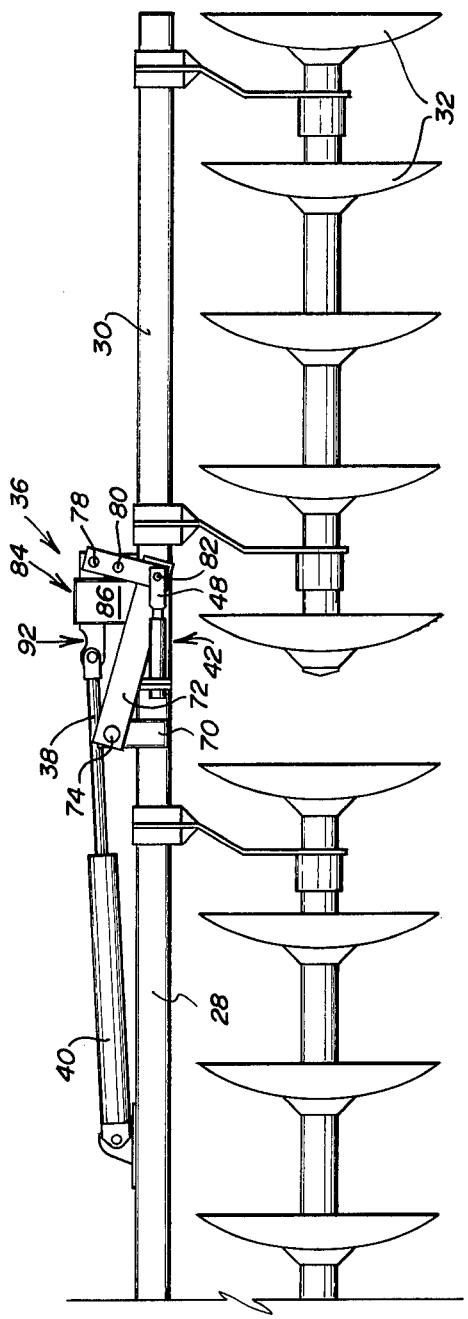
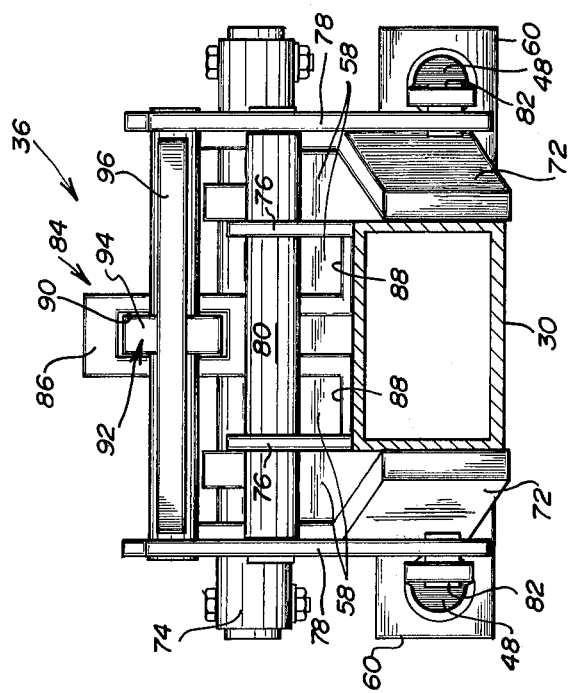
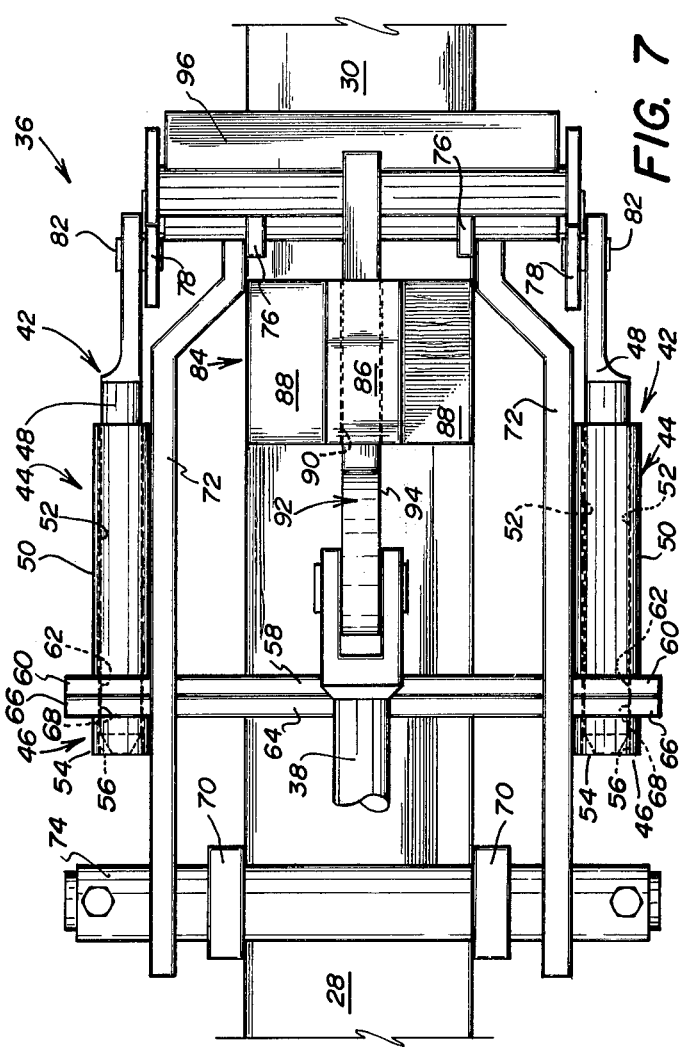

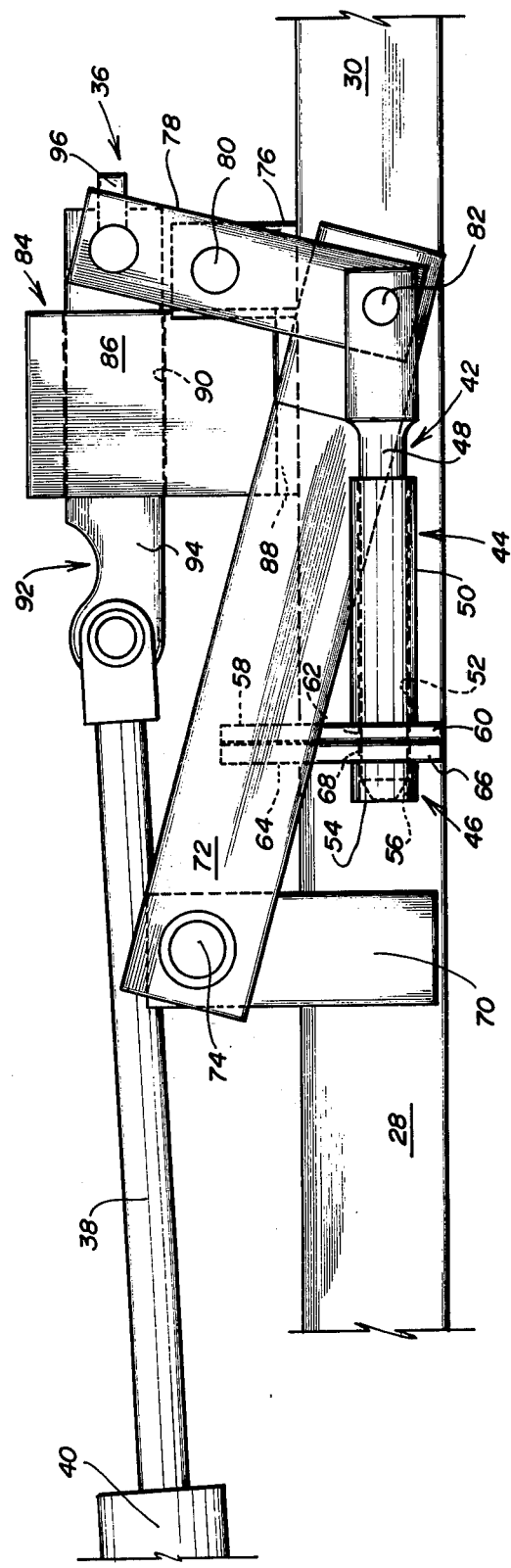
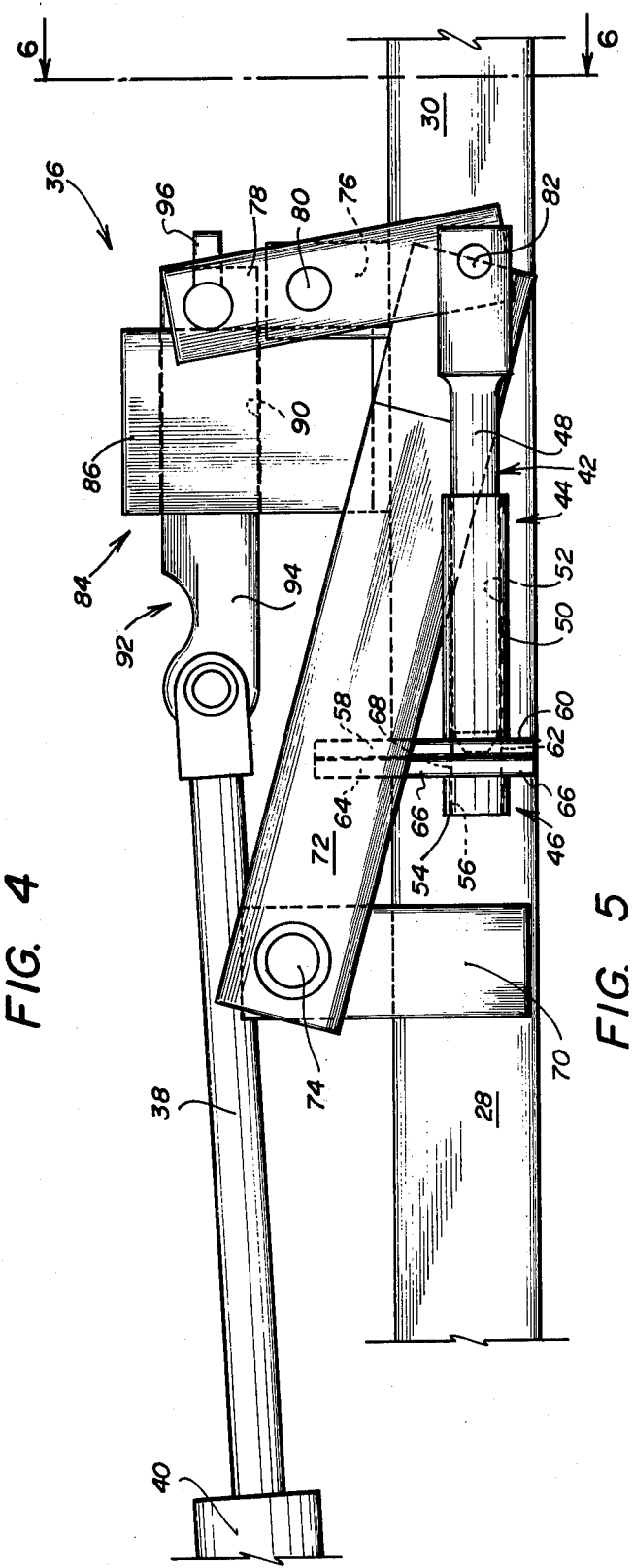

LOCK AND LIFT MECHANISM FOR A FOLDABLE IMPLEMENT

BACKGROUND OF THE INVENTION

This invention relates generally to earth working implements. More particularly, the invention relates to a novel lock and lift mechanism for folding wing implements, such as disc harrows and the like. The novel lock and lift mechanism allows the wing constituents of the implement to be securely locked in an operative position without maintaining pressure in the mechanism as the implement traverses the ground.

In the farm industry the trend toward more powerful tractors and the desirability to work larger areas of ground have resulted in the increasing of the weight and working width of implements, such as disc harrows and the like. Generally the working width of the implement has been increased by hinging, to a main implement section, a pair of extension implement wings which can be swung about the axis of a hinge to a folded position for transporting or storage of the implement and into a lowered or working position when desired. The use of such foldable wings has facilitated passage of the implements through gates and over roads as well as storage of the implement. However, one problem which has occurred in the use of such folding implements is that a means must be provided for maintaining the wings rigid with respect to the main implement section when the implement is in use so that the disc or other ground working tools of the wings penetrate the ground at the same depth as those of the central or main section. Thus, one of the principal considerations in the design of a folding frame implement is to provide a locking means for locking the extension wings in the rigid, working position. It is, of course, desirable that the locking means be both simple to operate and dependable in performance.

Heretofore, numerous lock and lift mechanisms have been proposed by the prior art which would allow a wing to be lifted, lowered and rigidly secured or locked to the main section when in the lowered position and yet would allow the operator to lift the wing relative to the implement when transporting or storing the implement. Some of such mechanisms are shown in U.S. Pat. Nos. 3,814,191; 3,692,121; 3,650,333; 3,693,724 and 2,719,682.

A need has long been recognized in the farm industry for a reliable and simple lock and lift mechanism for a foldable implement which is durable and allows the wings to be secured in place.

Accordingly, the present invention provides an improved lock and lift mechanism for a foldable implement having a main section and a least one wing pivotally mounted to the main section for folding relative thereto. The mechanism allows the wing unit to be locked in a working position, unlocked, and raised for transporting of the unit by operation of a single power source. Further, according to the invention, an improved lock mechanism is provided which does not require pressure to be maintained on the wing sections when the sections are in an extended working position and yet while simple to construct is durable and reliable in service.

DESCRIPTION OF THE DRAWINGS

A more complete understanding of the invention may be had by reference to the following detailed description when taken in conjunction with the accompanying drawings wherein:

FIG. 2 is a rear elevational view of a portion of the main tool bar and one of the wing tool bars in working, locked position depicting the lift and lock mechanism of the present invention;

FIG. 4 is an enlarged detailed side elevational view of the lift and lock mechanism for a wing tool bar with the parts in fully locked position;

FIG. 5 is a view corresponding to FIG. 4 with the parts in the position assumed just after the lift and lock mechanism is unlocked, but prior to raising of the wing;

FIG. 6 is a detailed sectional view taken generally along line 6—6 of FIG. 5; and FIG. 7 is an enlarged detailed top plan view of the lift and lock mechanism of the present invention with the parts in fully locked position.

DESCRIPTION OF THE PREFERRED EMBODIMENTS

Figure 1:
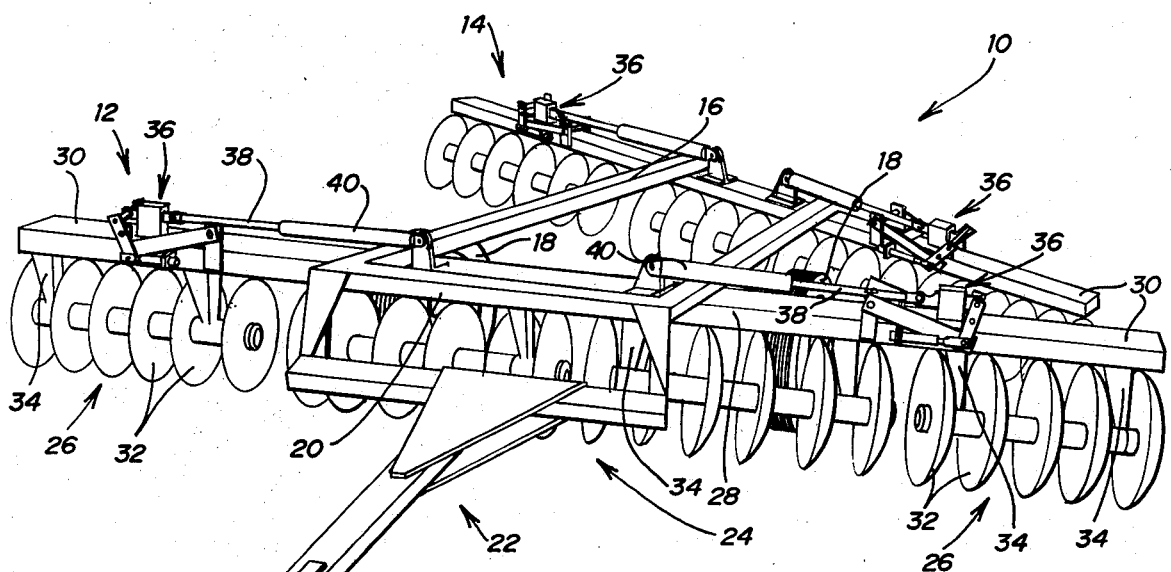
FIG. 1 is a perspective view of an offset disc harrow incorporating the lift and lock mechanism of the invention.

Referring now to the drawings, and particularly to FIG. 1 thereof, there is shown a farm implement 10 having a front disc gang 12 and a rear disc gang 14. Disc gangs 12 and 14 are substantial duplicates. For the sake of clarity, front disc gang 12 will be described in conjunction with the lock and lift mechanism of the invention. However, it is to be understood that identical parts as well as the operation of same are present on the rear disc gang as well as the front disc gang. Further, it should be noted that while the improved lock and lift mechanism of the present invention is depicted in conjunction with a disc harrow implement, such is not to be construed as limiting thereto but such lock and lift mechanism can be employed on any sectional agricultural implement. Further, the latch device described hereinafter can be readily used to lock any hinged joint.

Front disc gang 12 and rear disc gang 14 are mounted on frame member 16 carried by two or more supporting wheels 18, a cross bar 20 joining the forward ends of frame member 16 and having connected thereto a hitch structure 22 for attachment of the implement to a drawing vehicle such as a tractor, not shown. The drawing vehicle can be any suitable vehicle having a source of fluid under pressure and a valve means under control of the operator for directing the flow of the fluid. Front disc gang 12 includes a main section 24 and an extension or wing 26 at each end thereof.

Main section 24 comprises a main tool bar 28, such main tool bar being in the form of a rectangular-shaped beam, and each of the wings 26 comprises a wing tool bar 30. Main tool bar 28 and each of the wing tool bars 30 carry a gang of ground working tools, such as disc 32, suspended from the respective tool bars by hangers 34. Hinge means 36 pivotally connect extension tool bars 30 to central tool bar 28 as shown.

Figure 3:
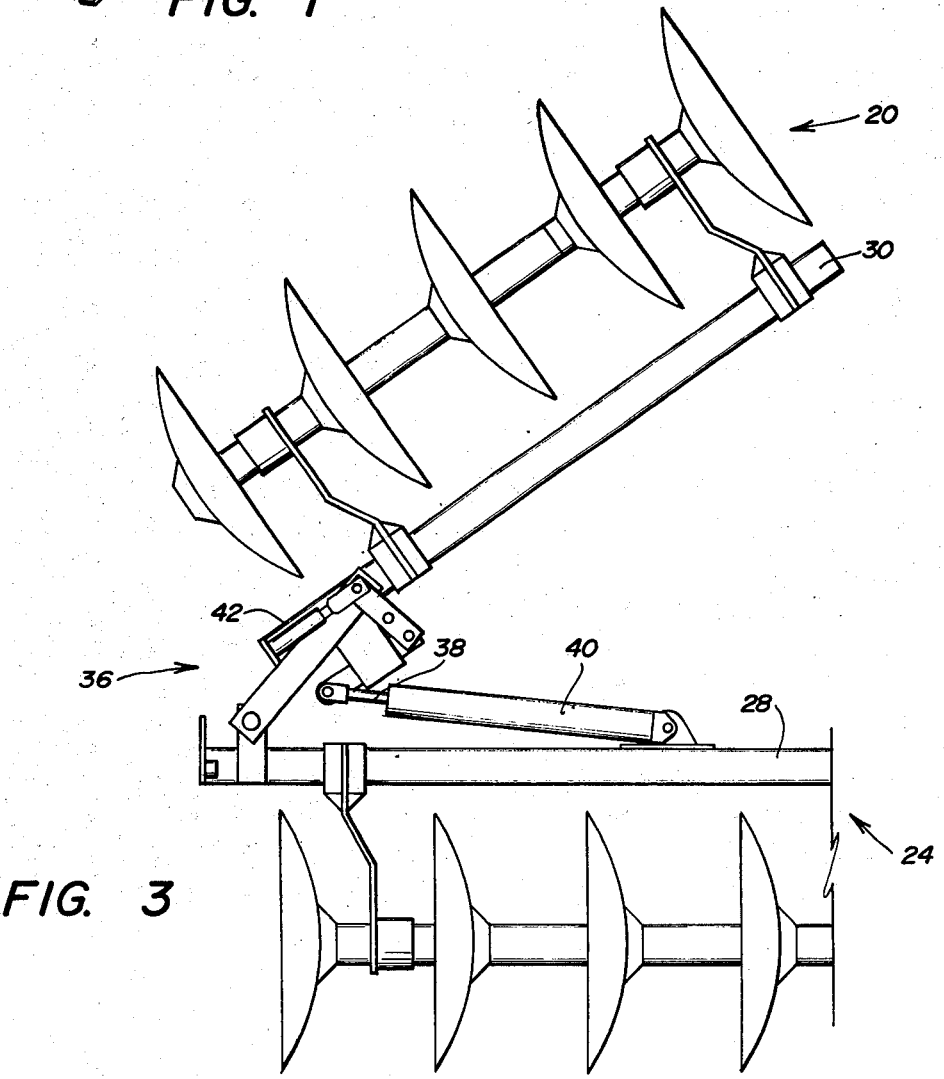
FIG. 3 is a rear elevational view of a portion of the main tool bar and one of the wing tool bars hinged thereto with the wing tool bar shown in a raised, folded position.

Referring now to FIGS. 2 and 3 in conjunction with FIG. 1, main tool bar 28 is pivotally connected to wing tool bar 30 by hinge means 36. Hinge means 36, which will be discussed in considerable detail hereinafter, enables wing tool bar 30 to be securely affixed in a horizontal working position with central tool bar 28 by lock means 42 as shown in FIGS. 1 and 2. Unlocking of hinge means 36 allows wing tool bar 30 to be pulled up and over main tool bar 28 and thus frame member 16 to assist in the storage and transportation of implement 10. Hinge means 36 is pivotally secured to the end of piston rod 38 carried by fluid pressure cylinder 40. Cylinder 40 is pivotally mounted to frame 16 of implement 10 by any suitable means. Fluid cylinder 40 is connected to and in fluid communication with the fluid source of the vehicle drawing the implement by any suitable means, such as hoses. Hinge means 36 is operatively connected to lock means 42 so that activation of hinge means 36 by fluid cylinder 40 results in activation of lock means 42.

For example, upon activation of cylinder 40, piston rod 38 is caused to be extended thus lowering extension tool bar 30 through hinge means 36 into a working position. Thereafter, continued movement of the piston rod 38 activates lock means 42 thereby locking and securing wing tool bar 30 in position. When desired, piston rod 38 can be caused to be retracted, thus unlocking lock means 42 so that wing 26 can be raised up and over main section 24 by continued retraction of piston rod 38.

Referring now to FIGS. 4, 5, 6 and 7 in combination with FIG. 2, the improved hinge means 36 and lock means 42 of the present invention will be described in detail. Lock means 42 comprises first guide means 44 secured to wing tool bar 30, second guide means 46 secured to main tool bar 28, and pin means 48 reciprocally received within said guide means to secure same together when wing tool bar 30 and thus disc 32 of wing 26 is in an extended working position.

First guide means 44 is a tubular housing member 50 having elongated passageway 52 therethrough. Tubular housing member 50 is secured to the side portions of extension tool bar 30 so that the longitudinal axis of passageway 52 is substantially parallel to the longitudinal axis of wing tool bar 30 and is therefore transverse to the axis of the main section 24. Second guide means 46 is provided with housing member 54 secured near the end portion of main tool bar 28. Housing member 54 is provided with a passageway 56 therethrough and housing member 54 is positioned so that passageway 56 is aligned with elongated passageway 52 of tubular housing member 50 when wing tool bar 30 is in an extended or unfolded position. A plate member 58 is secured to the end portion of wing tool bar 30 and is provided with ear members 60 having apertures 62. Plate member 64 is secured to the end portion of central tool bar 28 and is provided with ear members 66 having apertures 68 therein. Apertures 62 of ear member 60 are aligned with elongated passageway 52 of tubular housing member 56 and apertures 68 of ear member 66 are aligned with an opening 56 of housing member 54 to provide an unrestricted passageway therethrough for receiving pin means 48 when wing tool bar 30 is in an extended, unfolded position.

A pair of upwardly extending lugs 70 are secured near the end position of main tool bar 28. Lugs 70 are provided with aligned apertures in their upwardly extending end portions. Brace members 72 are each provided with an aperture in one end thereof. These apertures are aligned with the apertures of lugs 70 so that brace member 72 can be pivotally secured to the upwardly extending end portions of lugs 70 by any suitable means such as pin member 74. The other end portion of brace member 72 is rigidly affixed to wing tool bar 30 by any suitable means such as welding, bolting and the like.

A second pair of lug members 76 are secured to extension tool bar 30 proximate the point where brace member 72 is affixed thereto. Linkage members 78 are pivotally secured to lugs 76 at a position intermediate the end portions of linkage member 78 by pin 80. The lower extending end portions of linkage members 78 are pivotally secured to pin means 48 of lock means 42 by any suitable means known in the art, such as by bolt or pin 82.

Guide means 84 is rigidly secured to wing tool bar 30 at a position between the area of attachment of brace member 72 and the end portion of wing tool bar 30 adjacent main tool bar 28. Guide means 84 is provided with upwardly extending housing member 86 having at its lower portion flanges 88. Flanges 88 can be secured to wing tool bar 30 by any suitable means such as welding. Housing member 86 is provided with a passageway 90, which extends along and is parallel to the longitudinal axis of wing tool bar 30.

Linkage means 92 is slidably positioned within passageway 90 of housing member 86. One end portion of linkage means 92 is pivotally secured to linkage member 78, the other end portion being pivotally secured to the outwardly extending end portion of piston rod 38 of cylinder 40. Linkage means 92 is depicted as a substantially T-shaped member wherein the centrally located leg member 94 is positioned through passageway 90 and upper cross support member 96 serves as a stop mechanism for lock means 42, as will be discussed hereinafter.

In order to assist in a full understanding of the improved lock and lift mechanism of the present invention, the operation of lowering the wing of an implement to its locked or unfolded position will be described with reference to all of the drawings. Thereafter, the operation will be reversed and the raising of the wing to its unlocked or folded position will be described.

To lower wing 26 into a working position the operator activates fluid pressure cylinder 40 thereby causing piston rod 38 to extend. This extension results in an outward movement of linkage means 92 and thus an outward movement of wing tool bar 30. Movement is continued until wing tool bar 30 of wing 26 is aligned with main tool bar 28 of main section 24. Such alignment is achieved when plate member 58 and plate member 64 of wing tool bar 30 and main tool bar 28, respectively, become adjacent. At this time, pin means 48 of lock means 42 has become aligned with opening 56 of housing member 54. Continued extension of piston rod 38 causes pin means 48 to be slidably positioned within the passageway of housing member 54, thereby securely locking wing 26 to main section 24. It should be noted that once pin means 48 has been positioned within housing member 54 one does not need to maintain pressure on the cylinder to maintain wing 26 in a locked, unfolded position.

When it is desired to raise wing 26 for transporting or storage of implement 10, the operator activates cylinder 40 to retract piston rod 38. The initial inward movement of rod 38 results in inward movement of linkage means 92 and thus a withdrawal of pin means 48 from housing member 54. After this initial movement, e.g., the unlocking movement, upper cross support member 96 of linkage means 92 is forced adjacent housing 86 so that continued retraction of piston rod 38 lifts wing 26 into the desired carrying position.

While this invention has been explained in relation to certain specific embodiments, it is to be understood that various modifications thereof will now become apparent to those skilled in the art upon reading of the above, and it is intended to cover such modifications as fall within the scope of the appended claims.

What is claimed is:

1. In an implement having a central tool bar and at least one wing tool bar pivotally connected to said main tool bar for pivotal movement between a folded and an extended position, a lock means comprising:

a hinge means pivotally connected to said main tool bar and rigidly affixed to said wing tool bar;

housing means secured to one surface of said wing tool bar in close proximity to the end portion adjacent said main tool bar, said housing means having an opening therethrough defining a passageway parallel to the axis of said wing tool bar and a surface against which a force may be exerted during folding of the wing tool bar;

activating means secured to said implement;

T-shaped linking means extending through the passageway of said housing, the leg portion of said linking means being pivotally connected to said activating means and the top portion of said linking means extending to either side of the passageway and positioned to abut the surface on the housing mean when said linking means is being retracted by said actuating means to effect folding of said wing tool bar;

first guide means secured to at least one side portion of said wing tool bar in close proximity to its end portion adjacent said main tool bar, said guide means having an opening therethrough defining an elongated passageway along the axis of said wing tool bar;

second guide means secured to at least one side portion of said main tool bar in close proximity to said first guide means, said second guide means having an opening therethrough defining a passageway which is aligned with the passageway of said first guide means when said wing tool bar is in an extended position; and pin means pivotally secured to the other end portion of said linking means, said pin means slidably positioned within the passageway of said first guide means so that upon activation of said activating means said pin is caused to slidably pass into the passageway of said second guide means when said lock is in a locking position and to be slidably withdrawn therefrom when in an unlocked position.

2. The implement of claim 1, wherein:

said hinge means consists of a pair of substantially parallel upwardly extending lugs secured to said main tool bar near the end portion and a pair of brace members, each pivotally secured at one end to one of said lugs and rigidly secured at the other end to said wing tool bar.

3. The implement of claim 2, wherein:

said lock and hinge means includes linkage housing means secured to one surface of said wing tool bar in close proximity to the end portion adjacent said main tool bar, said housing means having an elongated opening therethrough defining a passageway parallel to the longitudinal axis of said wing tool bar, and linking means pivotally secured at one end thereof to said pin means, the other end thereof passing through said passageway of said housing means and pivotally secured to said activating means.

4. The implement of claim 3, wherein:

said first guide means includes a pair of first guide housings secured to opposite side portions of said wing tool bar, each guide housing having an elongated passageway therethrough;

said second guide means includes a pair of second guide housings secured to opposite side portions of said main tool bar, each of said second guide housings having a passageway therethrough;

said pin means includes a pair of pin members; and said linking menas includes a pair of first linkage members interconnected at one end portion by a brace member, the other end portion of each of said linkage members being pivotally connected to one end of said pin members, and a second linkage member positioned through the passageway of said housing means and pivotally connected at one end portion to said activating means and rigidly secured at its other end portion to said brace member.

5. The implement of claim 4, which includes:

a first plate member secured to the end portion of said wing tool bar adjacent said main tool bar, said plate member having a pair of apertures therein, said apertures therein being aligned with the elongated passageways of said first guide housings; and a second plate member secured to the end portion of said main tool bar, said second plate member having a pair of apertures therein, said apertures therein being aligned with passageways of said second guide housings.

6. The implement of claim 5, which includes:

a pair of substantially parallel upright lugs secured to said wing tool bar at a position substantially adjacent the edge portion of said linkage housing means removed from said main tool bar, each of said lugs being pivotally secured to one of said first linkage members at a position substantially intermediate their ends.

7. In an implement having a main tool bar and at least one wing tool bar pivotally connected to said main tool bar for pivotal movement between a folded and an extended position, a lift and lock means comprising:

a pair of substantially parallel upwardly extending first lugs secured to said main tool bar near an end portion;

a pair of brace members, each pivotally secured at one end to one of said first lugs and rigidly connected at the other end portion to said wing tool bar;

a pair of upwardly extending second lugs secured to said wing tool bar in the region of said brace members;

a first guide housing secured to the upper portion of said wing tool bar between the second lugs and the end of the tool bar adjacent said main section, said guide housing having an elongated passageway therethrough, the axis of which is substantially parallel to the longitudinal axis of said wing tool bar and having a surface against which a force may be exerted during folding of the wing tool bar;

a pair of third lugs each pivotally secured to one of said second lugs at a position intermediate the ends of said third lugs;

a first linkage member pivotally secured to the upwardly extending end portions of said third lugs said first linkage member having a surface adapted to abutt the surface on the guide housing during folding of the wing tool bar;

a fluid activated cylinder connected to said first linkage member for pivoting said third lugs;

a pair of guide housings secured to the opposite sides of said wing tool bar at the end portion adjacent said main tool bar, each of said housings having an elongated passageway therethrough, the axis of which is substantially parallel to the longitudinal axis of said wing tool bar;

a pair of guide housings secured to opposite sides of an end portion of said main tool bar, each of said guide housings having a passageway therethrough, said housings being aligned with and substantially abutting said guide housings on the wing tool bar when the wing tool bar is in an extended position thereby providing an unrestricted passageway therethrough; and pin members slidably positionable within the passageway of said second and third guide housings and pivotally attached to the lower extending end portions of said third lug members.

8. The lift and lock means of claim 7, which includes:

a first plate member secured to the end portion of said wing tool bar adjacent said main tool bar, said first plate member being provided with a pair of outwardly extending ear members, each ear member having an aperture therein, said aperture being aligned with one of the passageways of the guide housings on the wing tool bar, and a second plate member secured to the end portion of said main tool bar, said second plate member being provided with a pair of outwardly extending ear members, each ear member having an aperture therein, said aperture being aligned with one of the passageways of the guide housings on the main tool bar.

9. The lift and lock means of claim 8, wherein:

the fluid activated cylinder is a hydraulic cylinder operatively connected to a hydraulic pump of a towing vehicle.

* * * * *